Nov 1, 1949. O. JENSEN ET AL 2,486,602
TIMING DEVICE
Filed Aug. 11, 1945 3 Sheets-Sheet 1

INVENTORS
OTTO JENSEN
HERBERT C. GRAVES, JR.
BY
Ostrolenk & Faber
Attorneys

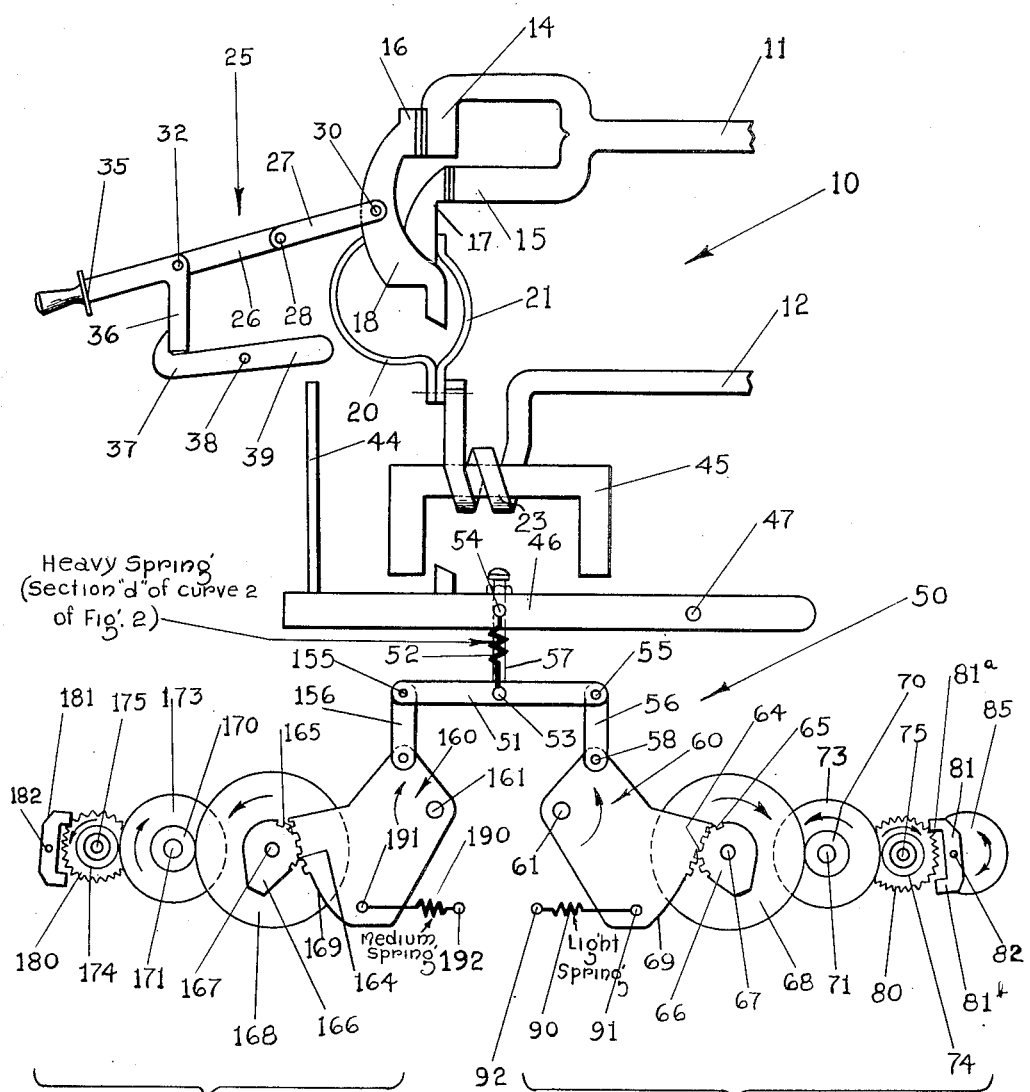

Patented Nov. 1, 1949

2,486,602

UNITED STATES PATENT OFFICE 2,486,602

TIMING DEVICE

Otto Jensen, Malvern, and Herbert C. Graves, Jr., West Chester, Pa., assignors to I-T-E Circuit Breaker Corporation, Philadelphia, Pa., a corporation of Pennsylvania Application August 11, 1945, Serial No. 610,274

10 Claims. (Cl. 185—37)

Our invention relates to circuit breakers and more specifically to novel tripping devices therefor adapted to be used in a system of circuit breakers arranged for sequential tripping over the entire protective range of the circuit breakers including the short circuit current ranges.

More specifically, our invention relates to a novel tripping device provided with direct acting overload elements which may be adjusted to secure sequential tripping with respect to other breakers in the system.

In distribution systems within, for instance, a large industrial plant, the power enters the plant through a main circuit breaker to the main distribution switchboard and is there fed out on a number of feeder circuits each protected by a circuit breaker. These feeders may each go to large loads. Some, or all, however, may go to additional distribution switchboards where they are again divided into smaller distribution circuits. Each of these circuits may in turn go to load centers or power panels for distribution of the energy to a multiplicity of loads.

Distribution systems of this type (of which a simplified diagrammatic illustration is hereinafter shown in the figures) are utilized not only in most industrial plants, but also wherever a large quantity of apparatus in a relatively compact unit must be operated from a central power source.

In such distribution systems, the fault current due to fault or short circuit conditions in one of the feeder circuits, or even in one of the load circuits, passes through several breakers in series and may result not merely in a tripping of the circuit breaker protecting that particular load, but in a tripping of each of the circuit breakers back of and in series with that particular circuit breaker back to the source, so that one of the main feeder breakers, or even the main breaker itself, may be tripped and thus disconnect the entire distribution system.

Accordingly, the primary problem to which this invention is directed is the construction and arrangement of such circuit breakers in a distribution system in such a novel manner that high speed seelctive tripping will occur, and so that the circuit breaker nearest the fault will be operative to clear an overcurrent, fault, or short circuit condition on the particular circuit it is protecting before the circuit breakers between it and the source can complete a tripping operation, and so that each circuit breaker in the system will be protected by the circuit breaker immediately behind it toward the source.

More specifically, we have invented a novel tripping device peculiarly adapted for use in a system in which the overload mechanisms of the circuit breakers in the system are so adjusted that the smallest circuit breakers for protecting the individual loads have a higher speed trip characteristic than other breakers in series with them, up to their maximum interrupting capacity. At or below maximum interrupting capacity of these load breakers, the adjustment of the overload mechanism of the adjacent circuit breaker in series with the load unit breaker (toward the source) becomes quick acting to trip its associated circuit breakers quickly and therefore protects the smaller load breaker. The overload mechanism of this adjacent circuit breaker is in turn adjusted to trip its associated breaker faster than the next circuit breaker (toward the source) in the series circuit thereby preventing tripping of this next circuit breaker at short circuit values approximately up to or below the maximum interrupting capacity of the preceding circuit breaker. This last circuit breaker is, in turn, tripped substantially instantaneously at short circuit currents of values substantially equal to or below the maximum interrupting capacity of the circuit breaker adjacent it toward the load.

In sequential tripping systems heretofore employed, the time separation between the various circuit breakers in the system has been effected by the provision of relays which have been set to various time delays and which on operation energize the shunt trip coils. Such systems are either very expensive and involved or can only provide sequential operation by timed intervals in the range of seconds since it is necessary in such a system that the relay first be energized sufficiently long to pull up its armature to close its contacts. When the armature has been moved to the energized position, and then only, does it energize the shunt trip coil which in turn must operate a second armature to operate the trip mechanism. Where instantaneous features were added, as was often the case, all circuit breakers in the sequence would open thus losing continuity of service.

We have discovered that we can secure sequential tripping of circuit breakers in a power system not only in the overload current ranges such as may occur in motor starting circuits, but also in the range of short circuit currents where the tripping must be extremely rapid.

This we effect by providing overload devices having an inverse time ratio which may substantially simulate the heating conditions of a load such as a motor to provide a time delay trip for the protection of such a load. This is followed by a quick trip protection at greater overload conditions such as at two to ten times the overload value of the particular breakers with a short inverse time or definite minimum time characteristic. In addition, a more definite ratio can be obtained by saturation of the magnetic circuit in the overload device.

Finally there is provided an instantaneous trip mechanism individual to each of said breakers. This latter is so arranged with respect to each of the other circuit breaker trip curves that each of the larger breakers (in a cascaded system) has substantially the same instantaneous tripping time as the next smaller breaker at the interrupting capacity of that smaller breaker.

At less than this interrupting capacity, each of the quick trip mechanisms, however, has a slightly slower tripping operation measurable in terms of a few cycles than the next smaller circuit breaker so that sequential tripping is still effected in such a short circuit current range close to maximum interrupting capacity of the breakers of the system.

A primary object of our invention, therefore, is the provision of a novel tripping device for a circuit breaker which will be selectively responsive at different speeds to different types of overload and short circuit.

Another object of our invention is the provision of a time delay device for a circuit breaker tripping mechanism wherein a single unitary time delay element may be provided with a plurality of independent adjustments for various time delays under different loads.

Still another object of our invention is the provision of a novel time delay device for the tripping elements of a circuit breaker which will adapt the circuit breaker for use in a sequential tripping system of the character above set forth.

Another object of our invention is the provision of a time delay device arranged to have characteristic curves for protecting normal overloads, such as starting current in motor circuits, while at the same time it has other characteristic curves for protection against various more excessive loads up to and including short circuits.

Another object of our invention is the provision of a novel time delay device for use in connection with tripping elements of circuit breakers arranged in a sequential tripping system in which both long time delay periods and quick trip operating periods are obtainable.

In a preferred form of our invention, the time delay comprises essentially a walking beam arrangement, the center of which is connected to the circuit breaker armature and each of the ends of which is connected to separate time delay elements. One end of the walking beam is connected to a time delay means which will provide a relatively long time delay; the other end is connected to a relatively short time delay means.

Under normal overloads, the end of the beam which is connected to the relatively long time delay means is free to move but is held back to allow for the long time delay interval. Under heavy overload conditions, the opposite end of the beam is free to move subject to the short time delay means. The long time delay means provides a time delay of the order of seconds, while the short time delay means provides a quick trip time delay of a few cycles.

The connection between the walking beam and the armature may be a spring, in which case, under extremely heavy currents or short circuits, the spring between the armature and the center of the walking beam is compressed or extended (depending on whether the spring is a compression or tension spring) and the armature may then move free of the beam and of the time delay means connected thereto in order to provide for instantaneous tripping.

As an alternative, an ordinary link connection may be made between the center of the walking beam and the armature, and the instantaneous spring may be connected between the one end of the walking beam and the time delay means associated with that end.

In the specific advance covered by our invention we provide an escapement type time delay means on each side, in which a verge engaging a ratchet wheel provides the specific time delay, and in which a mass may be added to the verge in order to provide variations in the time delay.

In selecting and constructing circuit breakers for installation on such a system in accordance with this invention, some or all of the following conditions are necessary:

1. Each main, feeder, sub-feeder, and load center breaker should preferably have a current carrying capacity equal to the carrying capacity of the cable or the load that it feeds.

2. The overload tripping device should have a time delay feature greater in current value and time than the normal operating surges that are imposed upon it, such as motor starting current. This is to prevent unnecessary tripping on harmless overloads. The time delay should have inverse characteristics and be selective with the other breakers in series with it.

3. At current values greater than normal surges, each breaker should trip as quickly as possible to minimize any damage to the breaker itself or the cable or load which the breaker feeds.

4. But at current values greater than normal surge values, there should be sufficient time delay in the tripping devices of the breakers in series so that the breaker nearest the fault will open first. Only this breaker should open (if the fault current is within the interrupting capacity of this breaker) leaving the remainder of the system intact and feeding the load. Here selectivity is obtained by the higher speed delay device.

5. If the fault current is greater than the interrupting capacity of the breaker nearest the fault (as may happen in installations where breakers are installed in "Cascade") then not only must the breaker nearest the fault open in the shortest time, but also the next breaker in series which has a higher interrupting capacity. This breaker must open to aid and protect the first breaker and must open quickly. If the second breaker in the series has insufficient interrupting capacity, the process must continue back towards the main breaker until a breaker opens that can clear the fault. On these high values of current, the breakers must open quickly to limit any damage and only the necessary breakers should open. Here the high speed instantaneous element is effective to trip faster than either of the two timing elements.

6. On each of the trip features, calibrated adjustment should preferably be provided so that a breaker may be co-ordinated with the other breakers in the system in which it may be used.

Our novel time delay device for circuit breaker trip mechanisms is designed to satisfy all of these elements. The foregoing and many other objects of our invention will become apparent from the following description and drawings in which Figure 1 is a schematic diagram of a group of circuit breakers in a typical distribution system.

Figure 3 is a schematic view illustrating the operation of our novel time delay mechanism.

Figure 2:
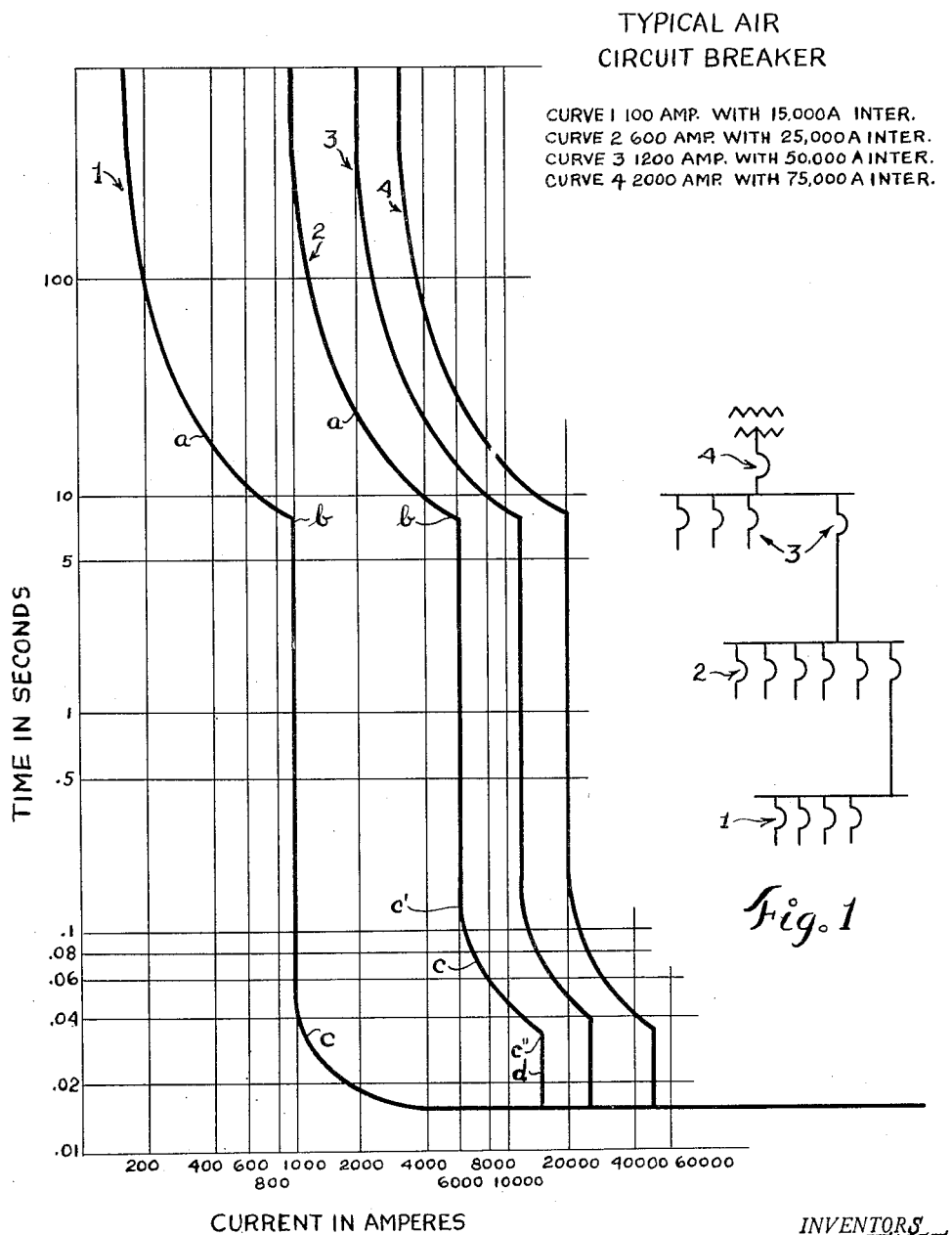
Figure 2 is a graph showing the tripping characteristics of each of the circuit breakers in the group.
Figure 1:
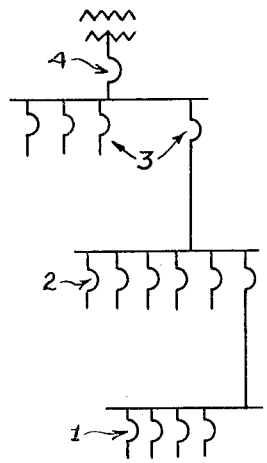

Referring now to Figures 1 and 2, we have here shown a typical distribution system having a plurality of circuit breakers together with a graph showing the tripping characteristics thereof. In this distribution system, the electrical energy is distributed at a utilization voltage of 440 volts, the various interrupting capacities for each of the breakers are shown in the curves.

The power enters the main plant by the circuit breaker 4, and then passes to a main distribution switchboard whence it is fed out on a number of feeder breakers 3. These feeders may each go to large loads. Some, or all, however, may go to additional distribution switchboards where they are again divided into a plurality of small distribution circuits to which energy is fed out over the circuit breakers 2. Each of these circuits may in turn go to load centers or power panels for distribution of the energy over the circuit breakers I to a multiplicity of loads.

As above pointed out:

1. Each circuit breaker should have a continuous capacity approximately equal to the capacity of the cable or the load (whichever is smaller) that it feeds.

2. Unnecessary tripping on harmless overloads, occurring because of normal operating surges, should be avoided by an appropriate time-delay feature having proper inverse time characteristics.

3. Each breaker should trip as quickly as possible at current values greater than the normal surges.

4. It is essential, however, that at such current values greater than the normal surge values, there should be sufficient time delay in the overload devices of the breakers in series, so that the breaker nearest the fault will open first. Thus, should the fault occur in the load circuit protected by circuit breaker I, this circuit breaker should be effective to clear that fault without causing a tripping of circuit breakers 2, 3 and 4. Consequently breakers 2, 3 and 4 should have sufficient time delay so that breaker I will have an opportunity to clear the fault.

5. However, if the fault current is greater than the interrupting capacity of the breaker nearest the fault, then not only should the nearest breaker open but also the next breaker in series which has a higher interrupting capacity. Thus, should the fault in a load circuit protected by circuit breaker I be greater than the capacity of breaker I but less than the capacity of breaker 2, then not only should breaker I open immediately but also breaker 2 should open as quickly as possible to protect not only the apparatus originally protected by breaker I, but to protect breaker I. If breaker 2 should have insufficient interrupting capacity for this purpose, then breaker 3 should open; and if breaker 3 should, in turn, have insufficient interrupting capacity, then breaker 4 should also open.

Thus, on extremely high values of current, the breakers must open quickly without any time delay to limit any damage; and yet however, only the necessary breakers should open.

6. Calibrated adjustments should be provided on the trip features of each circuit breaker so that a circuit breaker may be coordinated with the other breakers in the system in which it may be used.

The graph of Figure 2 illustrates these operations in connection with the distribution system of Figure 1. Each of the circuit breakers in the distribution system has similar characteristics of operation, and a specific description of one of the curves for one of the circuit breakers should suffice to illustrate the operation of the remainder.

Thus considering curve 2 for circuit breaker 2, which is a 600 ampere circuit breaker with a maximum interrupting capacity of 25,000 amperes, the upper part of the curve $a$ is the inverse time characteristic of the overload device. It is set at a high value to take care of starting motors directly across the line and other large surges frequently encountered in present day installations.

At ten times normal current or 6000 amperes at point $b$, the quick trip feature comes into play. This quick trip also has an inverse time feature, but the time delay value is very small, being of the order of one to six cycles of a 60 cycle wave. As shown, however, at portions $c$ and $d$ of curve 2, even this small time delay is defeated, and breaker 2 will open immediately at the value of the interrupting capacity (15,000 amperes) of the next smaller breaker (circuit breaker I) to protect this next smaller breaker. (For safety, this instantaneous trip may be 80% of 15,000 or 12,000 amperes.)

This illustration of the operation of circuit breaker 2 in connection with curve 2 illustrates a main principle underlying the present invention; that is, that each circuit breaker is ordinarily arranged to open the circuit which it protects before the circuit breakers of greater capacity back of it in series come into operation. Where, however, the capacity of the circuit breaker nearest the fault is exceeded, the next circuit breaker of greater capacity back of it in series will come into operation, and so on, until a circuit breaker is reached which can clear the load.

Each circuit breaker is given time delay characteristics which enable it to come into operation at the appropriate times, in order to protect the circuits as well as the circuit breakers which follow it in series.

In each circuit breaker a quick trip operation may be provided in addition to the overload time delay which has a short inverse or minimum time characteristic. This short inverse time delay functions to assure that any smaller breakers nearer the fault trip first and any larger breakers further from the fault trip later than any given breaker in the series.

Under very heavy currents, however, which completely exceed the interrupting capacity of the next smaller circuit breaker in series following a given circuit breaker, even the quick trip time delay is by-passed, and the given circuit breaker opens instantaneously without any delay whatever. This provides for immediate protection not merely of the original load and circuit, but also of the circuit breakers which follow in series after the given circuit breaker. Also, the instantaneous feature may increase the rupturing capacity of the breaker to which it is attached.

Thus in the system shown in Figure 1, the circuit breaker 1, as will be obvious, requires no instantaneous trip, but the quick trip is useful in order to quickly clear a fault before damage occurs and to make it selective with breaker 2 beyond 6000 amperes. Thus following curve 1 for circuit breaker 1, the section a, as above described, shows the operation of the circuit breaker under overcurrents which permit the time delay to operate.

Circuit breaker 1 is normally a 100 ampere circuit breaker with time delay up to ten times normal current; after which a quick trip is provided having a very short inverse time delay. Circuit breaker 1 has maximum interrupting capacity of 15,000 amperes.

Thus, following curve 1 it will be seen that at an overcurrent value of a little more than 200 amperes, it will take more than 100 seconds for the circuit breaker to trip. At an overcurrent, however, of 700 amperes, the circuit breaker will trip, should this overcurrent continue for about 8 seconds. However, should the overcurrent value be 1000 amperes, or 10 times the normal rating, then the quick trip comes into play, as shown at curve b or c, and the circuit breaker will trip within .05 second or substantially three cycles.

At greater overcurrent values the tripping operation will even be faster, as for example at 4000 amperes, in which case tripping occurs in .016 second or substantially one cycle.

At any of these values, breaker No. 1 has sufficient capacity to open the circuit. Accordingly, as shown by portion c of curve 2, circuit breaker No. 2 will not open due to the time delay which sufficiently delays the opening of the circuit breaker No. 2 so that circuit breaker No. 1 opens the circuit and renders the overload device of circuit breaker No. 2 ineffective before it can trip its circuit breaker. Thus, for example, at 4000 amperes, circuit breaker No. 1 opens in .016 second but circuit breaker No. 3 would take 10 seconds to open or 600 cycles.

However, at 15,000 amperes, as above pointed out, the interrupting capacity of circuit breaker 1 is exceeded, and it is necessary that the next circuit breaker open instantaneously. Consequently the next circuit breaker 2 is provided with an instantaneous trip which comes into operation at 15,000 amperes. This point is indicated at portion d of curve 2.

The other elements of curve 2 correspond in operation to the previously mentioned elements of curve 1. However, it will be seen that even a quick trip operation b of curve 2 occurs with some small time delay over portion c, roughly of the order of .15 second between c' and c''.

The instantaneous trip at 15,000 amperes arranged, however, so that even the quick trip time delay is overcome and the circuit breaker opens in .016 second and thus in less than a single cycle to protect circuit breaker 1.

Again, circuit breaker 2 has, as shown on drawing, a maximum interrupting capacity of 25,000 amperes. Consequently it is necessary that circuit breaker 3 become instantaneous at this point.

Circuit breaker 3, as shown by curve 3, has an ordinary time delay for ordinary overcurrent surges, a quick trip, and a time delay on the quick trip, as above pointed out in connection with curves 1 and 2. Circuit breaker 3 also has an instantaneous trip d which comes into operation at 25,000 amperes to by-pass even the quick trip time delay and to make the operation of circuit breaker 3 instantaneous at 25,000 amperes so that it too trips in about .016 second at this current value.

Similarly, since circuit breaker 3 has a maximum interrupting capacity of 50,000 amperes, circuit breaker 4 is arranged to be instantaneous at this value, as will be obvious from the graph of Figure 2; and thus circuit breaker 4 is instantaneous at any value from 50,000 to 75,000 amperes. The 75,000 amperes maximum interrupting capacity of circuit breaker 4 is designed to be greater than any possible current intensity which may occur in the entire distribution system.

The following specific examples are thus taken from the graph of Figure 2:

(a) A fault condition in one of the circuits protected by a circuit breaker 1 of approximately 2000 amperes.

Circuit breaker 1 will open within less than .02 second. The overload time delay of circuit breakers 2, 3 and 4 will not yet have permitted these circuit breakers to go into operations and only circuit breaker 1 will be necessary to clear the fault.

(b) A fault current of 10,000 amperes in a circuit protected by a circuit breaker 1.

Circuit breaker 1 will clear the fault within .02 second. The quick trip of circuit breaker 2 will have commenced operation, but the quick trip time delay will have been brought into action thus delaying the opening of circuit breaker 2 to about .05 second. Before .05 second has elapsed, circuit breaker 1, operating within less than .02 second, will have tripped open and cleared the fault so that the quick trip time delay of circuit breaker 2 will thus have delayed the opening of circuit breaker 2 until the fault has been cleared, and the armature of circuit breaker 2 will then drop back without tripping circuit breaker 2. The quick trip time delay, as hereinafter pointed out, is essentially an energy absorbing device.

(c) Assuming now a fault in the circuit protected by a circuit breaker 1 of 20,000 amperes.

Circuit breaker 1 will trip open within less than .02 second, but since its maximum capacity is 15,000 amperes, it will not serve to clear the fault. Simultaneously, circuit breaker 2, which becomes instantaneous at only 15,000 amperes, will be brought into immediate operation and will open within the same time of less than .02 second thus protecting circuit breaker 1. The quick trip of circuit breaker 3 will have been brought into operation but the quick trip time delay will have slowed down the operation of the quick trip of circuit breaker 3 so that at 20,000 amperes it would take .05 second to open; but by the time .05 second has elapsed, circuit breakers 1 and 2 will have opened, thus clearing the fault by means of a circuit breaker having sufficient capacity to do so, and the momentum absorbing device on circuit breaker 3 will then have been sufficient to prevent the completion of the trip of circuit breaker 3.

(d) Assuming a fourth current fault of 60,000 amperes in one of the feeders protected by circuit breaker 2.

Circuit breakers 2 and 3 would open instantaneously as shown by the graph of Figure 2. However, since the maximum capacity of these circuit breakers is respectively 25,000 and 50,000 amperes, these circuit breakers will not be sufficient to clear the fault. Consequently, as shown in the graph of Figure 2, circuit breaker 4 which becomes instantaneous at 50,000 amperes, will immediately be brought into operation to clear the fault.

(e) Assuming a 60,000 ampere fault in one of the individual circuits protected by circuit breaker No. 3 that is fed by the common bus of the circuit breaker No. 4.

In that event, the circuit breaker No. 4 individual to that circuit will open instantaneously. Similarly a 40,000 ampere fault in an individual circuit of one of the circuit breakers No. 3 would only cause that particular No. 3 circuit breaker to trip leaving the remainder of the system unaffected.

It is believed that these examples explain the operation of our system.

Thus, even though an overcurrent or short circuit condition occurs at a value at which the quick trip of a principal circuit breaker is brought into operation, nevertheless, the provision of an energy absorbing device in the quick trip provides a very short time delay of the order of 1 to 12 cycles for the circuit breaker next in series to clear the fault, so that only those circuit breakers absolutely necessary to clear the fault will be brought into operation and so that the others will remain closed.

Even this energy absorbing device which creates an extremely short time delay, as above pointed out, may be by-passed where the overcurrent or fault condition is of such value as to exceed the interrupting capacity of this or any other circuit breaker in series, in which case an instantaneous trip occurs.

The adaptability and flexibility of the sequential tripping arrangement described in Figure 1 makes it possible to apply this system in more complicated circuits. Since each of the characteristics of the tripping devices may be varied over wide ranges, many variations of the system and the settings may be made while nevertheless remaining within the principles of our invention.

In many systems the normal surges may be small and the time delay may therefore be set for a much shorter period; or the quick trip may be set at three times normal instead of ten times normal for closer protection.

In the above we have given a more or less general application of our invention. The application of the foregoing principles to our specific device shown in Figures 3 and 4 will now be obvious.

Referring now to Figure 3, we have here schematically shown a circuit breaker 10 having back connections studs 11 and 12, the said circuit breaker being mounted on any suitable panel. Current flows from the upper back connection stud 11 to the stationary arcing contact 14 and the stationary main contact 15 to the movable arcing contact 16 and the movable main contact 17. The movable contacts 16 and 17 are mounted on the contact arm 18 which is rotatably mounted in any suitable manner.

Current flows from the movable contacts 16 and 17 through the pigtails 20, 21 to the series connected overcurrent coil 23 and then to the lower back connection stud 12. A toggle 25 comprising the links 26 and 27 and the knee-pin 28 is pivotally connected at 30 to the contact arm 18 and is connected at its opposite end to the stationary pivot 32. Link 26 is extended to form the handle 35 and has a downward latching extension 36 engaged by the latch 37, which latch is pivotally mounted on the stationary pivot 38 and has an extension 39 on the opposite side of the pivot.

The circuit breaker is here shown entirely schematically. A suitable opening biasing means, such as a tension spring, may be secured to the contact arm 18 or to the mounting means thereof. Also, the circuit breaker here shown is not trip free. Most circuit breakers to which the present tripping device is applied are trip free; and the type of circuit breaker to which the mechanism of the present invention may be applied is shown in, for instance, Patent Nos. 2,348,228 and 2,375,328.

The series trip coil 23 energizes a magnet 45 which is arranged on the occurrence of predetermined circuit conditions to attract the armature 46 which is pivoted on the stationary pivot 47. When the armature 46 is attracted, the adjustable extension 44 thereof strikes the end 39 of the latch to permit the circuit breaker to trip.

Appropriate selective time delay for the circuit breaker in accordance with its position in the system is obtained by means of the time delay device 50, which consists of the beam 51. The center 53 of beam 51 is connected by the spring 52 to the pin 54 on the armature 46.

Passing through the armature 46 is the adjustable tension screw 57. The tension screw 57 provides for a predetermined load on the heavy spring 52. For any value of current, exerting a pull on the armature 46 less than the predetermined amount provided by the tension screw 57, there will be no elongation of the heavy spring 52 and it will function essentially as a solid link, transmitting the forces of the magnet 45 to the time delay mechanism 50.

The beam 51 is pivotally connected by the pin 55 at one end to the link 56, which in turn is connected to the pin 58 on the rotatable member 60.

The member 60 is rotatably mounted on the pin 61 and is provided with a toothed section 64 engaging the teeth 65 of the gear segment 66. Gear segment 66 is rotatably mounted on the pin 67 and has secured thereto the gear 68. Gear 68 meshes with the gear 70 rotatable on the pin 71, which gear 70 has secured thereto a gear 73. Gear 73 meshes with the gear 74 rotatably mounted on the pin 75. Gear 74 carries secured thereto a ratchet wheel 80 which is engaged by the verge 81.

The verge 81 is pivotally mounted on the pin 82. In the event that the armature 46 should be attracted with sufficient force to lift up the end 55 of beam 51 to rotate the member 60 in a counterclockwise direction about the pin 61, this will result in rotation of the ratchet wheel 80, in a clockwise direction, which rotation will be impeded or delayed by the verge 81; that is, end 81a of verge 81 will engage one of the teeth of the ratchet wheel 80 and as the wheel rotates also in a clockwise direction, verge 81 will be rotated clockwise around the pin 82 until the end 81b thereof engages a tooth of the ratchet wheel 80. This will result in a reverse movement of the verge 81 in a counterclockwise direction around the pin 82 until the ratchet wheel 80 has forced the verge 81 to the position where end 81a again engages a tooth of the ratchet wheel 80.

The ratchet wheel and hence the member 60 can rotate counterclockwise, therefore, only as fast as the verge 81 can reverse its motion. The verge 81, in order to provide for the appropriate time delay, is provided with an additional mass 85 secured thereto and rotatable therewith. The inertia of this mass slows down the entire time delay mechanism since, for each advance of the ratchet wheel by one tooth, the verge must reverse its motion and thus bring the mass 85 to a stop and start it moving in an opposite direction.

In the event of an overload condition persisting it will continue to rotate the member 60 until the toothed portion 64 and the teeth 65 of the gear segment 66 will eventually run into the blank space 69. This permits the member 60 to rotate free of the time delay gear train 68, 70, 80 and 81. Through the movement of link 56, arm 51, and spring 52, the armature 46 can seal against its magnet 45 and trip the breaker by striking the latch 39 through the extension 44.

The blank space 69 on the member 60 is designed so as to always be in engagement with the blank space on the gear segment 66. This assures identical successive operations of the timing mechanism since the same teeth will always mesh with each other.

Accordingly the mechanism comprising the rotatable member 60 and the gear train 64—74 connects the end 55 of the walking beam 51 to the verge 81 and its mass 85. The adjustable spring 90 connected at 91 to the rotatable member 60 and at 92 to a stationary member is adjusted so that it will permit the member 60 to rotate at relatively low overcurrent values, say at current values just above normal. This will permit the time delay device, including verge 81, to operate in the manner shown by section A of curve 2 of Figure 2.

Pin 155 of the beam 51 is connected by the link 156 to the rotatable member 160 which is rotatably mounted on the pin 161. Member 160 is provided with a toothed portion 164 engaging the gear segment 165 of the rotatable member 166, which rotates on the pin 167 and has secured thereto and rotatable therewith the gear 168.

Gear 168 meshes with the gear 170 rotatable on the pin 171 and carrying the gear 173. Gear 173 meshes with the gear 174 rotatable on the pin 175 and carrying the ratchet wheel 180. Ratchet wheel 180 is engaged by the verge 181 mounted on the pin 182.

The members 155—156—160 through 182 correspond exactly to the similar members 55—56—60 through 82 previously described, and have exactly the same time delay action. The difference is, however, that the verge 181 is not provided with a mass as is the verge 81 on the right side of the mechanism or is provided with a much lighter mass so that the time delay is much shorter or it may have fewer gears or a lower ratio of gear reduction. The time delay provided by the verge 81 is of the order of seconds, as shown at section A, curve 2 of Figure 2. The time delay provided by the verge 181 is of the order of cycles, as shown by section C, curve 2 of Figure 2.

The spring 190 attached at 191 to the member 160 and at the other end to the stationary member 192 is a heavier spring so that the end 155 of the beam 51 will be released at current values of the order of 10 times normal or higher so that the action of the time delay mechanism, including the verge 182, will correspond to section C, curve 2 of Figure 2. All of the various springs may of course be adjustable for calibration.

The operation of the time delay mechanism is so arranged that when a relatively low overcurrent, say twice normal, occurs, the tension of spring 90 is overcome and the end 55 of the beam 51 may be raised by the armature 46 pulling through the spring 52. The beam pivots about the pin 155. The verge 81 and its mass 85 through the gear train 64—74 provide a long time delay corresponding to the curve shown at section A, curve 2 of Figure 2. This time delay is of the order of seconds, as previously pointed out.

Where the overcurrent value is just above that necessary to permit the spring 90 to allow rotation of the member 60, then the time delay provided by the verge 81 is much longer than when the current value approaches a much higher figure, say 3 or 4 times normal. In the latter case, since the attractive force is much greater, the speed, by which the member 60 is rotated counterclockwise about the pivot 61 and hence the speed of rotation of the other members, is greater, and the time delay is accordingly less.

Where the force on the armature 46 is sufficient to overcome the force of the spring 190 for the short time delay device (when the force corresponds, for instance, to section C of curve 2 of Figure 2) then the member 160 will rotate clockwise about the pin 161 to permit the end 155 to rise.

Since the verge 181 in this case has no inertia member, the time delay will be very much less as shown at section C of curve 2 of Figure 2, and will cause a delay of a matter of cycles rather than of seconds. The attractive force of the armature 46 will at the same time be sufficient to release the lighter spring 90; but since the time delay obtained by the weighted verge 81 is so much greater, the pin 55 will effectively serve as a pivot around which the beam 51 will rotate in a clockwise direction as the end 155 is raised.

Where an extremely heavy current or short circuit occurs resulting in attraction of the armature 46 by the magnet 45 by an extreme force requiring an instantaneous tripping of the circuit breaker, then the spring 52 is so arranged that it will permit the armature 46 to move free of the beam 51 which is momentarily at least held in place by the time delay mechanism including the verge 181 and the verge 81. This instantaneous operation resulting in extension of the spring 52 (where a tension spring is used) thus releases the armature 46 entirely from the time delay mechanism and permits an instantaneous trip.

By this means, three species of time delay are obtained by the single mechanism: a long time delay which is permitted to operate by reason of the fact that the force of the light spring 90 is overcome at low overcurrent values; a short time delay or relatively quick trip operation which is obtained when the attractive force of the armature 46 is sufficient to overcome the force of the spring 190; and an instantaneous trip with no time delay when the attractive force of the armature 46 is sufficient to overcome the force of the heavy spring 52.

The device herein is shown schematically as above pointed out. It is obvious, of course, that the elements may be much more compact when arranged for actual operation; that, for instance, the elements extending from the member 60 to the verge 81 may extend toward the left from the right-hand link 56 on one side, and the elements including members 156—160 to 182 may extend toward the right from the left-hand end 155 of the beam 51.

Also, the various gear members may be arranged so that certain of the gears may have inside teeth on an annular flange rather than outside teeth permitting greater compactness of the device. These are obvious mechanical expedients which are suggested by way of example only.

Figure 4:
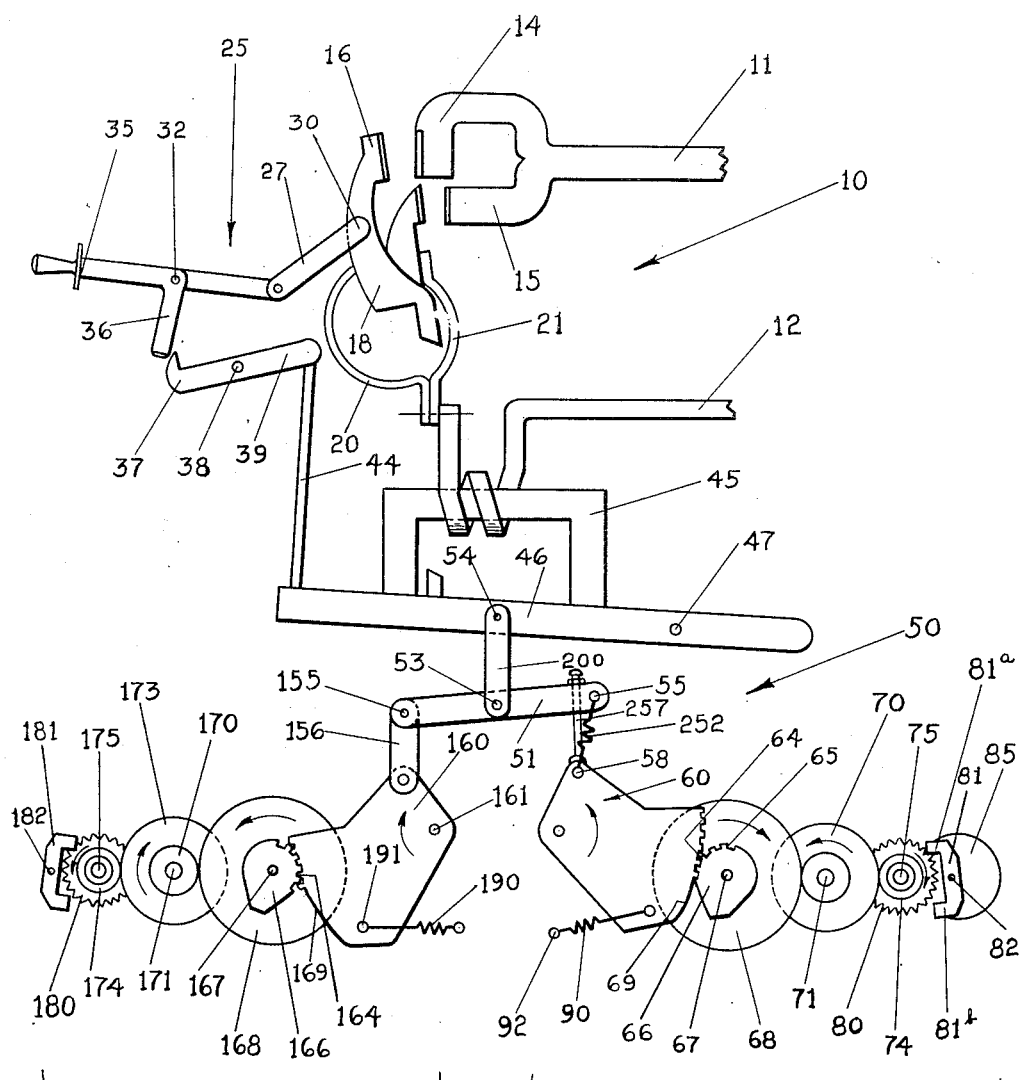
Figure 4 is a schematic view showing a slightly modified form of the time delay mechanism of Figure 3.

In Figure 4 we have shown a very slight modification of our invention in which the heavy spring which permits instantaneous trip operation is connected between the end 55 of beam 51 and the pin 58 of the long time delay member 60. This spring 252 is so arranged that its force will be overcome only when the armature 46 is attracted by short circuit currents or currents of a predetermined high value requiring instantaneous trip of the circuit breaker. The beam 51 is here connected to the armature by a link 200 rather than by the spring 52 of Figure 3.

All of the other elements are the same. The spring 252 has the same action as the link 56 of Figure 3 for all current values up to that at which instantaneous tripping is required. At the moment that the armature 46 is attracted with sufficient force to require instantaneous tripping and hence with sufficient force to overcome the force of spring 252, the spring 252 will be extended and the end 55 of the beam 51 will rise, rotating counterclockwise around the pin 155 which is momentarily held in relatively stationary position by the time delay mechanism, including the verge 181, and will thus permit the armature 46 to move instantaneously to the tripping position shown.

The actual position shown in Figure 4 is that in which a tripping operation of the circuit breaker has occurred as a result of a relatively low overcurrent corresponding to section A of curve 2 of Figure 2, in which the force of spring 90 has been overcome and the end 55 of the armature has been raised subject, however, to the time delay of the long time delay verge 81. Exactly the same operation would occur for the same current conditions in Figure 3 as in Figure 4 and the position of the mechanism would be the same during tripping under relatively low overcurrent conditions in Figure 3 as in Figure 4.

Under relatively high overcurrent conditions short of those under which instantaneous tripping is desired, the end 55 of the beam 51 in either Figures 3 or 4 remain stationary while the end 155 rises to permit the armature 46 to move to trip position. This is so by reason of the fact that the force of both springs 90 and 190 is overcome but the long time delay of verge 81 tends to hold the end 55 of beam 51 relatively stationary while the end 155 moves with relatively great speed.

At the instantaneous trip point, the spring 52 of Figure 3 is extended to permit the armature to rise clear of the beam 51; or in the case of Figure 4, the spring 252 is extended to permit the beam 51, link 200, and armature 46 to rise clear of the two time delay mechanisms to provide instantaneous tripping. The operation of the armature 46 for instantaneous tripping will be truly instantaneous in Figure 3 where, at the instantaneous trip point, the armature is free of even the walking beam.

However, the slight time delay obtained in Figure 4 at the instantaneous trip point by reason of the weight of beam 51 and link 200 is relatively insignificant (amounting to a mere fraction of a cycle) since the mass of the armature is by far greater than that of the beam 51 and link 200. As a matter of fact, in the case of Figure 4 the armature 46 may be so arranged about its pin 47 that the weight of the portion of the armature to the left of the pin 47 and the link 200 and beam 51 will be balanced by the portion of the armature to the right of the pin 47.

In the Figure 3 case, the armature need merely be balanced so that the weight of the armature along to the left of the pin 47 should be equal to the weight of the armature to the right of the pin 47.

In the foregoing we have described our invention solely in connection with a specific embodiment thereof and in connection with a system with which it is adapted to be utilized. Since many variations and modifications of our invention should now be obvious to those skilled in the art, we prefer to be bound not by the specific description herein contained but only by the appended claims.

We claim:

1. In time delay mechanisms for circuit breaker trip apparatus having an armature; a beam; a connection between said armature and substantially the central portion of said beam; a first time delay means; a connection between said beam and said first time delay means; a second time delay means; a connection between said beam and said second time delay means; the connections between said beam and said two time delay means being on opposite sides of the connection between said beam and said armature.

2. In time delay mechanisms for circuit breaker trip apparatus having an armature; a beam; a connection between said armature and substantially the central portion of said beam; a first time delay means; a connection between said beam and said first time delay means; a second time delay means; a connection between said beam and said second time delay means; the connections between said beam and said two time delay means being on opposite sides of the connection between said beam and said armature; one of said two time delay means providing a longer time delay than the other.

3. In time delay mechanisms for circuit breaker trip apparatus having an armature; a beam; a connection between said armature and substantially the central portion of said beam; a first time delay means; a connection between said beam and said first time delay means; a second time delay means; a connection between said beam and said second time delay means; the connections between said beam and said two time delay means being on opposite sides of the connection between said beam and said armature; resilient means individual to each of said two time delay means for restraining movement of each said time delay means; each of said resilient means being overcome by a force on said armature of predetermined value.

4. In time delay mechanisms for circuit breaker trip apparatus having an armature; a beam; a connection between said armature and substantially the central portion of said beam; a first time delay means; a connection between said beam and said first time delay means; a second time delay means; a connection between said beam and said second time delay means; the connections between said beam and said two time delay means being on opposite sides of the connection between said beam and said armature; resilient means individual to each of said two time delay means for restraining movement of each said time delay means; each of said resilient means being overcome by a force on said armature of predetermined value; the resilient means for preventing movement of the first time delay means being overcome by a force less than that required to overcome the resilient means preventing movement of the second time delay means.

5. In time delay mechanisms for circuit breaker trip apparatus having an armature; a beam;

a connection between said armature and substantially the central portion of said beam; a first time delay means; a connection between said beam and said first time delay means; a second time delay means; a connection between said beam and said second time delay means; the connections between said beam and said two time delay means being on opposite sides of the connection between said beam and said armature; resilient means individual to each of said two time delay means for restraining movement of each said time delay means; each of said resilient means being overcome by a force on said armature of predetermined value; the resilient means for preventing movement of the first time delay means being overcome by a force less than that required to overcome the resilient means preventing movement of the second time delay means; the second time delay means providing a shorter time delay than the first time delay means.

6. In the time delay mechanisms for circuit breaker trip apparatus having an armature; a beam; a connection between said armature and substantially the central portion of said beam; a first time delay means; a connection between said beam and said first time delay means; a second time delay means; a connection between said beam and said second time delay means; the connections between said beam and said two time delay means being on opposite sides of the connection between said beam and said armature; resilient means individual to each of said two time delay means for restraining movement of each said time delay means; each of said resilient means being overcome by a force on said armature of predetermined value; the resilient means for preventing movement of the first time delay means being overcome by a force less than that required to overcome the resilient means preventing movement of the second time delay means; the second time delay means providing a shorter time delay than the first time delay means; the connection between the beam and the armature being resilient, said last mentioned connection being adjusted so that the armature may move free of the beam on a force on said armature greater than the force required to overcome the force of the resilient means restraining the second time delay means.

7. In time delay mechanisms for circuit breaker trip apparatus having an armature; a beam; a connection between said armature and substantially the central portion of said beam; a first time delay means; a connection between said beam and said first time delay means; a second time delay means; a connection between said beam and said second time delay means; the connections between said beam and said two time delay means being on opposite sides of the connection between said beam and said armature; each time delay means comprising a rotatable mass and a gear between the rotatable mass and the connection between the time delay means and the rotatable mass.

8. In time delay mechanisms for circuit breaker trip apparatus having an armature; a beam; a connection between said armature and substantially the central portion of said beam; a first time delay means; a connection between said beam and said first time delay means; a second time delay means; a connection between said beam and said second time delay means; the connections between said beam and said two time delay means being on opposite sides of the connection between said beam and said armature; each time delay means comprising a plurality of rotatable masses.

9. In time delay mechanisms for circuit breaker trip apparatus having an armature; a beam; a connection between said armature and substantially the central portion of said beam; a first time delay means; a connection between said beam and said first time delay means; a second time delay means; a connection between said beam and said second time delay means; the connections between said beam and said two time delay means being on opposite sides of the connection between said beam and said armature; each time delay means comprising a rotatable mass and escapement mechanism for controlling the movement of the rotatable mass.

10. In time delay mechanisms for circuit breaker trip apparatus having an armature; a beam; a connection between said armature and substantially the central portion of said beam; a first time delay means; a connection between said beam and said first time delay means; a second time delay means; a connection between said beam and said second time delay means; the connections between said beam and said two time delay means being on opposite sides of the connection between said beam and said armature; one of said two time delay means providing a longer time delay than the other; each time delay means comprising a rotatable mass and escapement mechanism for controlling the movement of the rotatable mass; the escapement mechanism for the longer time delay means having a time delaying mass secured thereto.

OTTO JENSEN.
HERBERT C. GRAVES, Jr.

REFERENCES CITED

The following references are of record in the file of this patent:

UNITED STATES PATENTS

| Number | Name | Date |
|---|---|---|
| 1,123,288 | Hellmund | Jan. 5, 1915 |
| 1,154,359 | Basch | Sept. 21, 1915 |
| 2,071,857 | Smith | Feb. 23, 1937 |